(12) United States Patent
Camelon et al.

(10) Patent No.: US 9,043,646 B2
(45) Date of Patent: May 26, 2015

(54) CLIENT SELECTABLE SERVER-SIDE ERROR RESOLUTION

(71) Applicant: International Business Machines Corporation, Armonk, NY (US)

(72) Inventors: John Camelon, Ottawa (CA); Evan Hughes, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/693,438

(22) Filed: Dec. 4, 2012

(65) Prior Publication Data

US 2013/0159767 A1 Jun. 20, 2013

(30) Foreign Application Priority Data

Dec. 20, 2011 (CA) .................................... 2762696

(51) Int. Cl.
*G06F 11/00* (2006.01)
*G06F 11/07* (2006.01)

(52) U.S. Cl.
CPC ........ *G06F 11/0709* (2013.01); *G06F 11/0793* (2013.01)

(58) Field of Classification Search
CPC ............ G06F 11/0703; G06F 11/0709; G06F 11/0769; G06F 11/0793; H04L 29/14; H04L 11/00
USPC ............................................ 714/2, 26, 46, 57
See application file for complete search history.

(56) References Cited

U.S. PATENT DOCUMENTS

| | | | | |
|---|---|---|---|---|
| 5,835,698 | A | * | 11/1998 | Harris et al. ..................... 714/15 |
| 6,029,258 | A | * | 2/2000 | Ahmad .......................... 714/46 |
| 6,334,193 | B1 | * | 12/2001 | Buzsaki ........................... 714/2 |
| 7,007,200 | B2 | | 2/2006 | Salem |
| 7,284,160 | B2 | | 10/2007 | Skog et al. |
| 7,293,201 | B2 | * | 11/2007 | Ansari ....................... 714/38.14 |
| 7,360,125 | B2 | * | 4/2008 | Krebs ............................. 714/48 |
| 7,415,524 | B2 | | 8/2008 | Burd et al. |
| 7,861,120 | B2 | | 12/2010 | Cui |
| 8,078,914 | B2 | * | 12/2011 | Leeb et al. ...................... 714/26 |
| 8,689,060 | B2 | * | 4/2014 | Balko ............................ 714/48 |
| 2007/0174731 | A1 | * | 7/2007 | Haeberle et al. ................ 714/46 |
| 2007/0260943 | A1 | * | 11/2007 | Haskell ......................... 714/57 |
| 2008/0133970 | A1 | * | 6/2008 | Son et al. ....................... 714/26 |
| 2008/0141066 | A1 | | 6/2008 | Wood et al. |
| 2008/0201607 | A1 | * | 8/2008 | Braeker et al. ................. 714/15 |
| 2008/0209255 | A1 | * | 8/2008 | Seguin et al. .................... 714/2 |

(Continued)

OTHER PUBLICATIONS

Rudolph, Mark, The Got Instant Messenger, IT—University of Copenhagen, Jun. 6, 2003.

*Primary Examiner* — Marc Duncan

(74) *Attorney, Agent, or Firm* — Steven M. Greenberg, Esq.; CRGO Law

(57) ABSTRACT

An illustrative embodiment of a computer-implemented process for client selectable server-side data error resolutions receives a request from a client to perform an action on a server, identifies a data error during performance of the action of the request and generates a response including an error description and a resolution subset for the identified error. The computer-implemented process further sends a response to the client, receives a selected resolution returned from the client, and responsive to a determination the selected resolution associated with the token returned executes on the server, executes the selected resolution, associated with the token returned, on the server to correct the data error.

20 Claims, 5 Drawing Sheets

(56) References Cited

U.S. PATENT DOCUMENTS

| | | | |
|---|---|---|---|
| 2008/0263404 A1* | 10/2008 | Vidiyala | 714/38 |
| 2009/0106603 A1* | 4/2009 | Dilman et al. | 714/42 |
| 2010/0115348 A1* | 5/2010 | Gilluwe | 714/57 |
| 2010/0229052 A1 | 9/2010 | Cuneo et al. | |
| 2011/0264964 A1* | 10/2011 | Murphy et al. | 714/48 |
| 2012/0047391 A1* | 2/2012 | Dhoolia et al. | 714/2 |
| 2013/0059578 A1* | 3/2013 | Finberg | 455/425 |
| 2013/0111277 A1* | 5/2013 | Klemenz et al. | 714/57 |
| 2013/0311839 A1* | 11/2013 | Brunswig et al. | 714/57 |
| 2014/0082407 A1* | 3/2014 | Kochut et al. | 714/2 |

* cited by examiner

System 300

CLIENT SELECTABLE SERVER-SIDE ERROR RESOLUTION

CROSS-REFERENCE TO RELATED APPLICATIONS

This application claims priority under 35 U.S.C. §119(a) to Canadian Patent Application Serial Number 2762696, filed Dec. 20, 2011, the entirety of which is incorporated herein by reference.

BACKGROUND

1. Technical Field

This disclosure relates generally to client server processing in a data processing system and more specifically to client selectable server-side data error resolutions in the data processing system.

2. Description of the Related Art

When an error occurs on a server in an implementation of a client-server architecture, the client is often responsible for displaying the error and suggesting possible resolutions. In large installations of heterogeneous clients, ensuring every client has the capacity to handle all errors the server may detect is difficult.

Client implementations typically differ. For example, clients may be implemented using different programming languages, operate on incompatible platforms relative to one another, or be difficult to update. All of these factors contribute to difficulties when attempting to ensure all clients are able to suggest an identical resolution, because the resolution must be ported to each platform.

SUMMARY

According to one embodiment, a computer-implemented process for client selectable server-side data error resolutions receives a request from a client to perform an action on a server, identifies a data error during performance of the action of the request, generates a resolution subset of one or more resolutions for the error from a set of candidate resolutions, generates a token for each of the one or more resolutions in the resolution subset for the error, generates a response including an error description and the resolution subset for the identified error, and sends the response to the client. The computer implemented process further receives a token for the selected resolution from the client, determines whether the selected resolution associated with the token returned executes on the server; and responsive to a determination the selected resolution associated with the token returned executes on the server, executes the selected resolution, associated with the token returned, on the server to correct the data error.

According to another embodiment, a computer program product for client selectable server-side data error resolutions comprises a computer recordable-type media containing computer executable program code stored thereon. The computer executable program code comprises computer executable program for receiving a request from a client to perform an action on a server, computer executable program code for identifying a data error during performance of the action of the request, computer executable program code for generating a resolution subset of more or more resolutions from a set of candidate resolutions, computer executable program code for generating a token for each of the one or more resolutions in the resolution subset for the error, computer executable program code for generating a response including an error description and the resolution subset for the identified error, and computer executable program code for sending the response to the client, computer executable program code for receiving a token for the selected resolution returned from the client, computer executable program code for determining whether the selected resolution associated with the token returned executes on the server, and computer executable program code responsive to a determination the selected resolution associated with the token returned executes on the server, for executing the selected resolution, associated with the token returned, on the server to correct the data error.

According to another embodiment, an apparatus for client selectable server-side data error resolutions comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a request from a client to perform an action on a server, identify a data error during performance of the action of the request, generate a resolution subset of one or more resolutions for the error from a set of candidate resolutions, generate a token for each of the one or more resolutions in the resolution subset for the error, generate a response including an error description and the resolution subset for the identified error, and send the response to the client. The processor unit further executes the computer executable program code to direct the apparatus to receive a token for the selected resolution from the client, determine whether the selected resolution associated with the token returned executes on the server, and responsive to a determination the selected resolution associated with the token returned executes on the server, execute the selected resolution, associated with the token returned, on the server to correct the data error.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
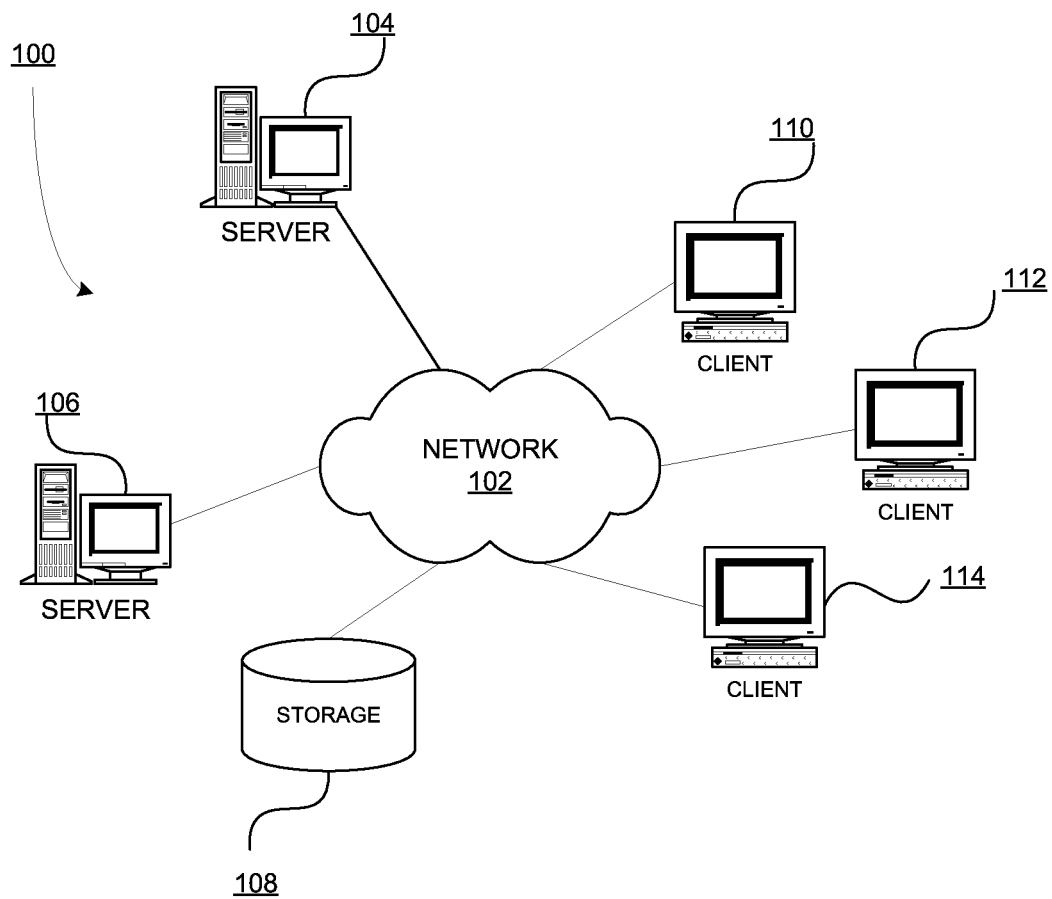
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, radio frequency (RF), etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
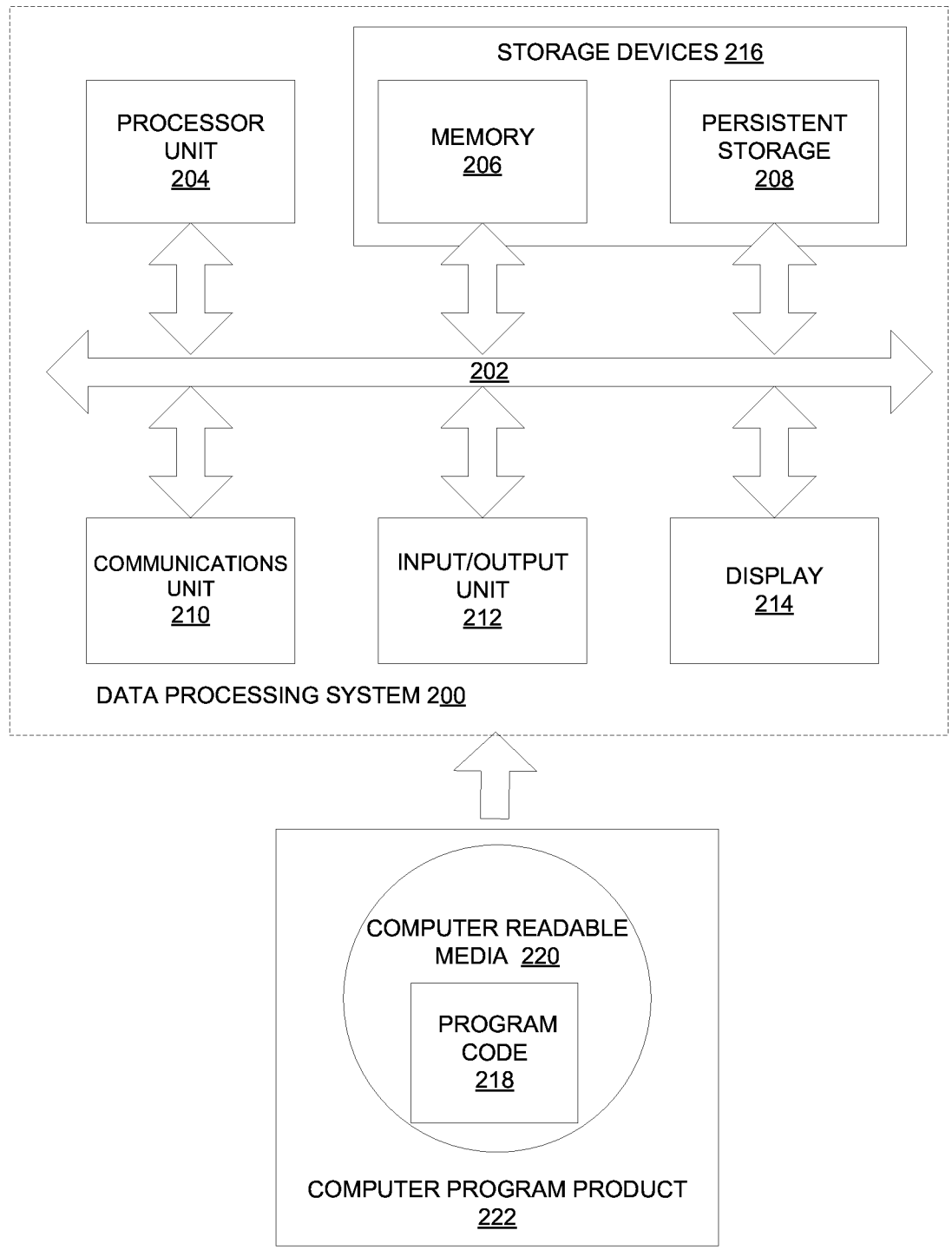
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for client selectable server-side data error resolutions is presented. Processor unit 204 receives a request from a client to perform an action on a server, through communications unit 210, input/output unit 212 and identifies a data error during performance of the action of the request and generates a response including an error description and a resolution subset for the identified error typically saved in storage devices 216 temporarily. Processor unit 204 further sends, using communications unit 210, a response to the client, and receives the token for the selected returned from the client. Responsive to a determination the selected resolution associated with the token returned executes on the server, processor unit 204 executes the selected resolution, associated with the token returned, on the server to correct the data error and responsive to a determination the selected resolution associated with the token returned does not require action on the client, processor unit 204 sends a response representative of a result of executing the selected resolution to the client using communications unit 210.

Figure 3:
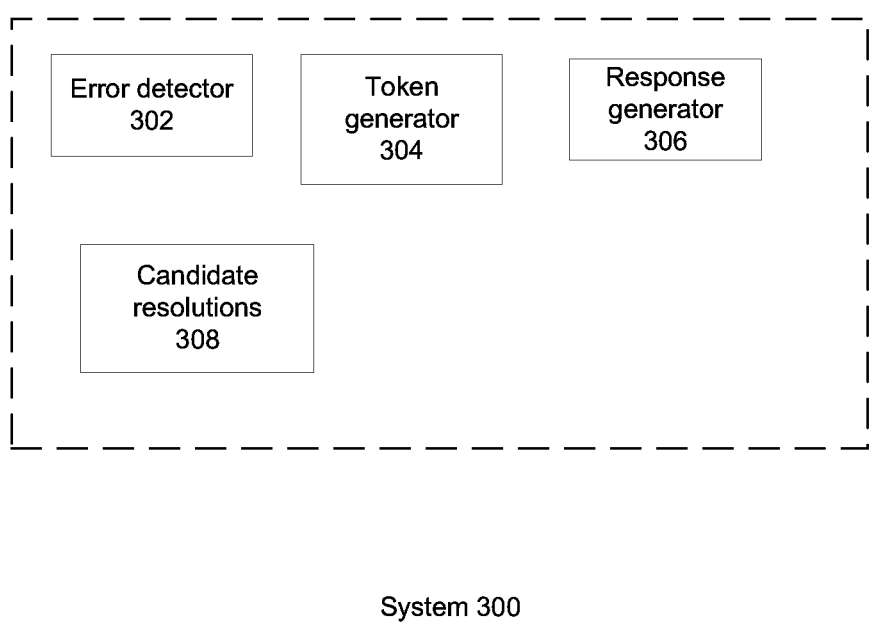
FIG. 3 is a block diagram representation of a server system operable for various embodiments of the disclosure.

With reference to FIG. 3 a block diagram representation of a server system operable for various embodiments of the disclosure is presented. System 300 is an example embodiment of a data processing system providing the capability of a server in accordance with the disclosure.

System 300 leverages support of an underlying data processing system such as server 104 of network data processing system 100 of FIG. 1 or data processing system 200 of FIG. 2 for operational support including storage and networking capabilities. System 300 comprises a number of functional components, which may be implemented as discrete components within the system or combined in various combinations according to implementation or packaging needs without departing from the capability provided. In the example of FIG. 3, system 300 is presented as a number of components including error detector 302, token generator 304, response generator 306 and candidate resolutions 308. System 300 functions in an interactive environment having one or more clients, of differing implementations, in communication with system 300 typically referred to as a client-server implementation. Clients in this example are accordingly non-homogeneous.

Error detector 302 is a logical or physical component providing a capability of recognizing an occurrence of an error with respect to data being processed by system 300. For example, an error may refer to syntactically or semantically incorrect information. Error detector 302 provides a data driven capability to notify other interdependent components of system 300.

Error detector 302 further identifies a type of error associated with the error. The type may be in the form of a category or an identifier and is used to identify a possible set of resolutions.

Token generator 304 is a logical or physical component providing a capability of building a token exchanged with a respective client in a possible resolution of the identified error. A token can take many forms. Trivially, the token may be entirely opaque to the client, for example, a token may be created as a string of bytes sent to a client that the client returns to the server as a payload in a larger protocol. A token is returned from a client to a server indicating a selected resolution from among a subset of proposed resolutions presented to a user of the client.

More nuanced protocols may expect the client to use the token in some manner, for example, a representational state transfer (REST) or hypertext transport protocol (HTTP) based remote procedure call (RPC) or remote method invocation (RMI) protocol may use the token as a universal resource indicator (URI) for an HTTP request or destination of an RPC/RMI call. More complex protocols may expect the client to transform the token before use. In all cases, the mechanism remains the same in that the token is an error-independent selector used in identifying a resolution. The token is created by the server, sent to the client, and returned by the client back to the server.

Response generator 306 is a logical or physical component providing a capability of creating a response containing information including an error description, a set of possible resolutions for the identified error. Each resolution in the set of possible resolutions has a portion including a human readable resolution description, zero or more local actions for a client to perform before and/or after the resolution is executed and a token that can be returned to the server to specify the associated resolution should be executed on the server. The client renders the error description and the set of possible resolutions of the response to enable a user to select an appropriate resolution.

Candidate resolutions 308 is a set of solutions for a respective known set of errors encountered during server processing of data associated with a client server session. The set of solutions comprise one or more solutions. Candidate resolutions 308 may comprise static elements, dynamic elements or a combination of static and dynamic elements as needed. For example, static elements associated with a specific error may be maintained as a list of resolutions. In another example, a set of possible resolutions may be created dynamically using the identified error as an indicator for a category of errors and associated possible resolutions. In another example, a set of possible resolutions may be created using a static stub portion in association with a dynamic portion such as when an error occurs for a single file in one instance and for multiple files in another instance.

Figure 4:
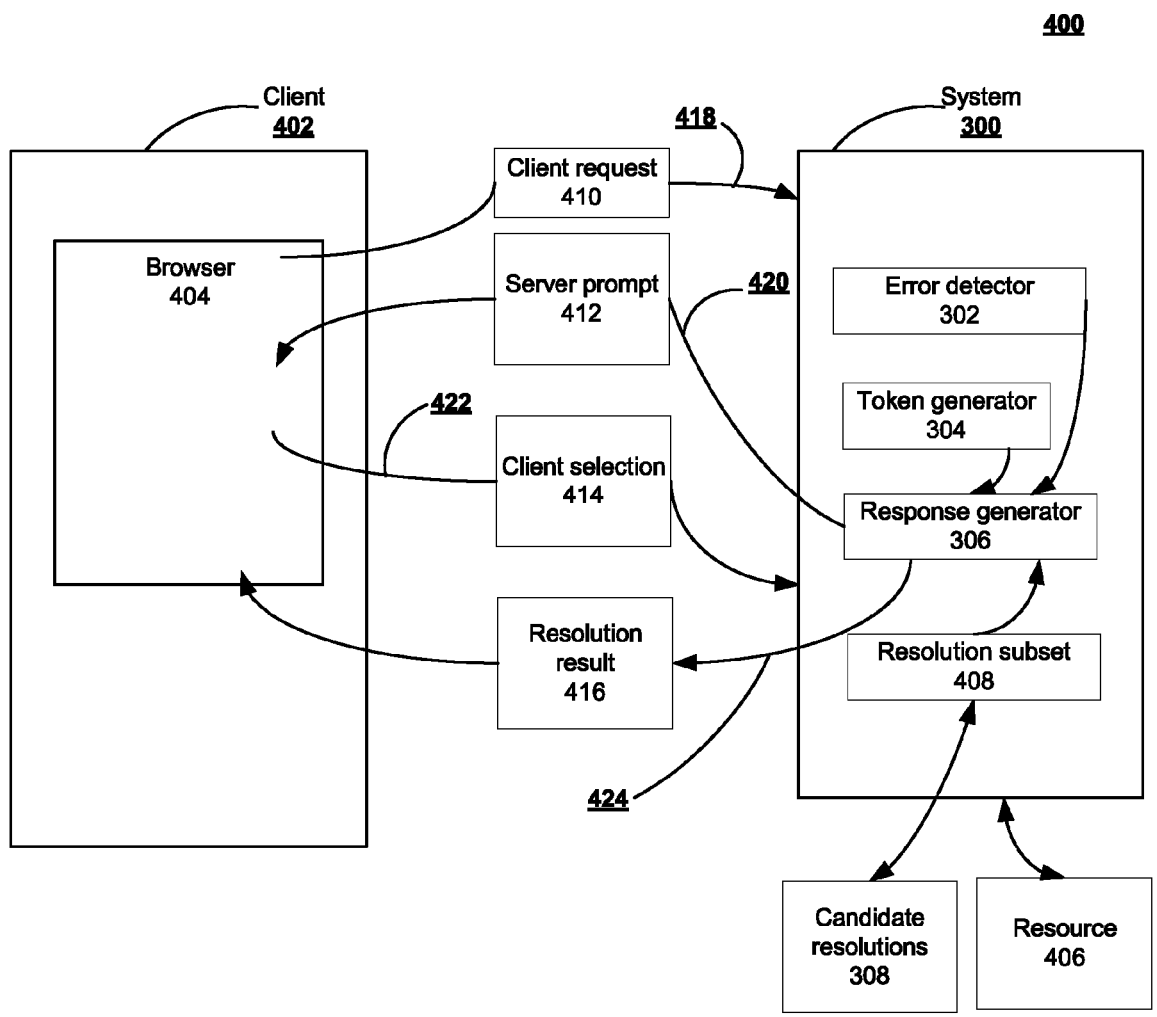
FIG. 4 is a block diagram of client and server interaction using the system of FIG. 3 in accordance with one embodiment of the disclosure.

With reference to FIG. 4 a block diagram of client and server interaction using the system of FIG. 3 in accordance with one embodiment of the disclosure is presented. View 400 is an example of data flow between a client and a server within an embodiment using the system of FIG. 3.

View 400 represents an example of an error handling sequence in accordance with an embodiment using system 300 of FIG. 3 between client 402 having browser 404 and a server representative of system 300. System 300 receives client request 410 using communication flow 418. A typical request from a client is for processing of a server side resource such as resource 406. For example, client 402 may request to save previously edited multiple source files stored within resource 406.

Using the example, system 300 of FIG. 3 detects an error when saving the edited multiple source files using error detector 302 of FIG. 3. As part of the error handling process of the system, token generator 304 of FIG. 3 creates one or more tokens for use by client 402 and system 300 of FIG. 3 using the save operation of the example.

Using the identified error, system 300 of FIG. 3 creates resolution subset 408 by filtering candidate resolutions 308 of FIG. 3. Resolution subset 408 contains one or more possible resolutions applicable to the identified error.

Response generator 306 creates a response containing a description of the error and resolution subset 408. The message is sent as server response 412 using communication flow 420 to client 402. Client 402 renders server response 412 in browser 404 for a user, typically as a user prompt.

The user on client 402 makes a selection from server response 412 forming client selection 414 which is sent to system 300 of FIG. 3 using communication flow 422. Client selection 414 comprises information including the token representative of the resolution selected from resolution subset 408 sent initially from the server of system 300 of FIG. 3 to client 402 communication flow 420. Part of the selection process may also require client 402 to perform a set of zero or more local actions in the resolution. The local actions are performed if the client 402 is capable of performing them.

Upon receiving the token for the selected resolution, system 300 of FIG. 3 performs the specified resolution (which may comprise one or more operations). Upon completion of the specified resolution the response generator of the system creates resolution result 416 and sends the message to client 402 over communication flow 424. Resolution result 416 comprises an indication of success or failure of the resolution and a set of zero or more local actions for client 402 to perform as a result. The local actions are performed if the client 402 is capable of performing them.

Figure 5:
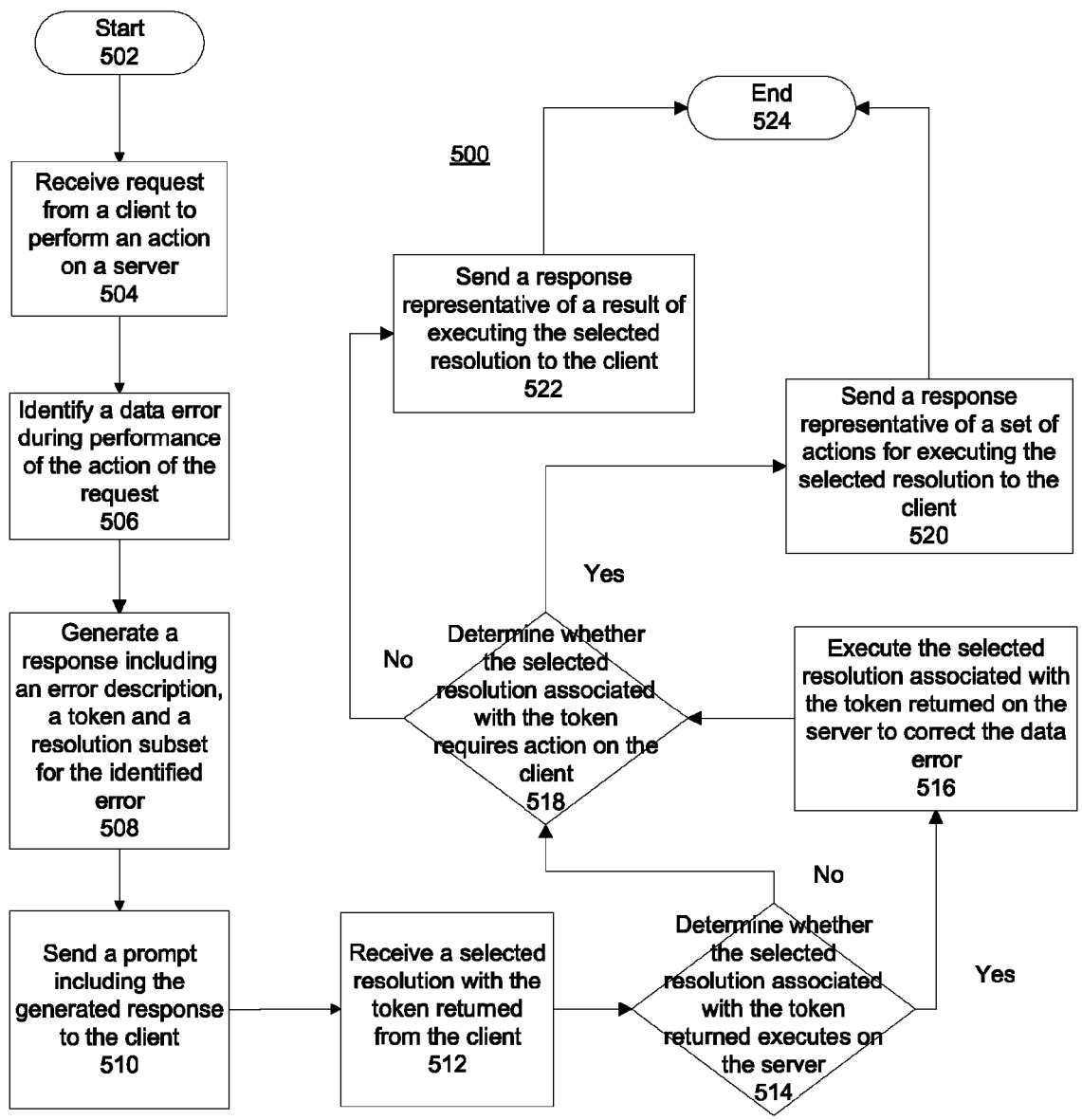
FIG. 5 is a flowchart of a process using the system of FIG. 3 in accordance with one embodiment of the disclosure.

With reference to FIG. 5 a flowchart of a process using the system of FIG. 3 in accordance with one embodiment of the disclosure is presented. Process 500 is an example of using system 300 of FIG. 3 to manage a server side error associated with processing data on the server.

Process 500 begins (step 502) and receives a request from a client to perform an action on data associated with a server (step 504). Process 500 identifies a data error during performance of the requested action (step 506). The identified data error is related to data associated with the requested action. Identification includes information comprising a type, category, identifier and resource indicator such as an operation and file or object useful to distinguish an error from among a set of possible errors.

Process 500 generates a response including an error description and a resolution subset for the identified error (step 508). The resolution subset is a set of potential resolutions filtered from a larger set of candidate solutions, using the information associated with the identified error. The resolution subset comprises one or more resolutions.

Process 500 sends the generated response to the client submitter of the request (step 510). The client renders the information in the response associated with the identified error in a browser enabling a user to make a selection from the resolution subset provided in the response. The client, if capable, executes a set of actions associated with the selected resolution, as identified by a specific resolution. The set of actions may comprise zero or more actions, depending upon the resolution selected.

Process 500 receives a token for the selected resolution returned from the client (step 512). Process 500 determines whether the selected resolution associated with the token returned executes on the server (step 514). A set of actions comprising one or more actions of the selected resolution may require execution on the server, the client or both to correct the identified data error.

Responsive to a determination the selected resolution associated with the token returned executes on the server, process 500 executes the selected resolution associated with the token returned on the server to correct the data error (step 516). A selected resolution can require execution of one or more operations for the set of actions comprising one or more actions associated with the selected resolution to correct the identified data error. Responsive to a determination the selected resolution associated with the token returned does not execute on the server, process 500 determines whether the selected resolution associated with the token returned requires action on the client (step 518). Responsive to completion of execution of the received selected resolution on the server, process 500 performs step 518 as just described. Responsive to a determination the selected resolution associated with the token returned requires action on the client, process 500 sends a response representative of a set of actions for executing the selected resolution to the client (step 520) terminating thereafter (step 524). Responsive to a determination the selected resolution associated with the token returned does not require action on the client, process 500 sends a response representative of a result of executing the selected resolution to the client (step 522) terminating thereafter (step 524). The result includes information indicative of success or failure of the selected resolution in terms of correcting the identified error as well as a set of local actions for the client to perform, wherein the set of actions comprises zero or more actions. For example, a client may be required to perform operations on local data. Processing in some cases causes synchronization of updated data resulting from the execution of the resolution on the server. Data on the client accordingly is one of synchronized with corresponding data on the server or updated independent of corresponding data on the server.

Thus is presented in an illustrative embodiment a computer-implemented process for client selectable server-side data error resolutions. The computer-implemented process receives a request from a client to perform an action on a server, identifies a data error during performance of the action of the request and generates a response including an error description and a resolution subset for the identified error. The computer-implemented process further sends the response to the client, receives a token for the selected resolution returned from the client, and determines whether the selected resolution associated with the token returned executes on the server. Responsive to a determination the selected resolution associated with the token returned executes on the server, the computer-implemented process executes the selected resolution, associated with the token returned, on the server to correct the data error, determines whether the selected resolution associated with the token returned requires action on the client and responsive to a determination the selected resolution associated with the token returned does not require action on the client, sends a response representative of a result of executing the selected resolution to the client.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for client selectable server-side data error resolutions, the computer-implemented process comprising:
   receiving a request from a client to perform an action on a server;
   identifying a data error during performance of the action of the request;
   generating a resolution subset of one or more resolutions for the error from a set of candidate resolutions;
   generating a token for each of the one or more resolutions in the resolution subset for the error;
   generating a response including an error description and the resolution subset for the identified error,
   sending the response to the client;
   receiving a token for the selected resolution from the client;
   determining whether the selected resolution associated with the token returned executes on the server, on the client, or both; and
   responsive to a determination the selected resolution associated with the token returned executes only on the server, executing the selected resolution, associated with the token returned, on the server to correct the data error.

2. The computer-implemented process of claim 1 wherein identifying a data error during performance of the action of the request further comprises:
   identifying the data error related to data associated with the action of the request, wherein identification includes information comprising a type, category, identifier and resource indicator comprising one or more of an operation identifier and object used to distinguish an error from among a set of possible errors.

3. The computer-implemented process of claim 1 wherein generating a response including an error description and the resolution subset for the identified error further comprises:
   defining a resolution in the resolution subset comprising a portion including a human readable resolution description and zero or more local actions for the client to perform before or after the resolution is executed portion; and
   generating a token for instructing a server to execute an associated resolution, wherein the token is error independent.

4. The computer-implemented process of claim 1 further comprising:
   responsive to a determination the selected resolution associated with the token returned requires action on the client, sending the response representative of a set of actions for executing the selected resolution to the client, whereby data on the client is one of synchronized with corresponding data on the server and updated independent of corresponding data on the server.

5. The computer-implemented process of claim 1 wherein the resolution further comprises:
   a set of actions to be completed on a set of resources associated with the data of the data error, wherein a set comprises one or more elements including parameters for execution.

6. The computer-implemented process of claim 1 wherein the resolution further comprises:
   determining whether the selected resolution associated with the token returned requires action on the client; and
   responsive to a determination the selected resolution associated with the token returned does not require action on the client, sending a response representative of a result of executing the selected resolution to the client 7. The computer-implemented process of claim 6 wherein sending a response representative of a result of executing the selected resolution to the client further comprises:
   including information indicative of success or failure of the selected resolution in terms of correcting the identified error and a set of actions for the client to perform on the client, wherein the set of actions comprises zero or more actions.

8. A computer program product for client selectable server-side data error resolutions, the computer program product comprising:
   a non-transitory computer recordable-type memory comprising a memory device containing computer executable program code stored thereon, the computer executable program code comprising:
   computer executable program code for receiving a request from a client to perform an action on a server;
   computer executable program code for identifying a data error during performance of the action of the request;
   computer executable program code for generating a resolution subset of more or more resolutions from a set of candidate resolutions;
   computer executable program code for generating a token for each of the one or more resolutions in the resolution subset for the error;
   computer executable program code for generating a response including an error description and the resolution subset for the identified error;
   computer executable program code for sending the response to the client;
   computer executable program code for receiving a token for the selected resolution returned from the client;

computer executable program code for determining whether the selected resolution associated with the token returned executes on the server, on the client, or both;

computer executable program code responsive to a determination the selected resolution associated with the token returned executes only on the server, for executing the selected resolution, associated with the token returned, on the server to correct the data error.

9. The computer program product of claim 8 wherein computer executable program code for identifying a data error during performance of the action of the request further comprises:

computer executable program code for identifying the data error related to data associated with the action of the request, wherein identification includes information comprising a type, category, identifier and resource indicator comprising one or more of an operation identifier and object used to distinguish an error from among a set of possible errors.

10. The computer program product of claim 8 wherein computer executable program code for generating a response including an error description and the resolution subset for the identified error further comprises:

computer executable program code for defining a resolution in the resolution subset comprising a portion including a human readable resolution description and zero or more local actions for the client to perform before or after the resolution is executed portion; and computer executable program code for generating a token for instructing a server to execute an associated resolution, wherein the token is error independent.

11. The computer program product of claim 8 further comprising:

computer executable program code responsive to a determination the selected resolution associated with the token returned requires action on the client, for sending the response representative of a set of actions for executing the selected resolution to the client, whereby data on the client is one of synchronized with corresponding data on the server and updated independent of corresponding data on the server.

12. The computer program product of claim 8 wherein the resolution further comprises:

a set of actions to be completed on a set of resources associated with the data of the data error, wherein a set comprises one or more elements including parameters for execution.

13. The computer program product of claim 8 wherein the resolution further comprises:

computer executable program code for determining whether the selected resolution associated with the token returned requires action on the client; and computer executable program code responsive to a determination the selected resolution associated with the token returned does not require action on the client, for sending a response representative of a result of executing the selected resolution to the client.

14. The computer program product of claim 13 wherein computer executable program code for sending a response representative of a result of executing the selected resolution to the client further comprises:

computer executable program code for including information indicative of success or failure of the selected resolution in terms of correcting the identified error and a set of actions for the client to perform on the client, wherein the set of actions comprises zero or more actions.

15. An apparatus for client selectable server-side data error resolutions, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

receive a request from a client to perform an action on a server;

identify a data error during performance of the action of the request;

generate a resolution subset of one or more resolutions for the error from a set of candidate resolutions;

generate a token for each of the one or more resolutions in the resolution subset for the error;

generate a response including an error description and the resolution subset for the identified error;

send the response to the client;

receive a token for the selected resolution from the client;

determine whether the selected resolution associated with the token returned executes on the server, on the client, or both; and responsive to a determination the selected resolution associated with the token returned executes only on the server, execute the selected resolution, associated with the token returned, on the server to correct the data error.

16. The apparatus of claim 15 wherein the processor unit executes the computer executable program code to identify a data error during performance of the action of the request further directs the apparatus to:

identify the data error related to data associated with the action of the request, wherein identification includes information comprising a type, category, identifier and resource indicator comprising one or more of an operation identifier and object used to distinguish an error from among a set of possible errors.

17. The apparatus of claim 15 wherein the processor unit executes the computer executable program code to generate a response including an error description and the resolution subset for the identified error further directs the apparatus to:

define a resolution in the resolution subset comprising a portion including a human readable resolution description and zero or more local actions for the client to perform before or after the resolution is executed portion; and generate a token for instructing a server to execute an associated resolution, wherein the token is error independent.

18. The apparatus of claim 15 wherein the processor unit executes the computer executable program code to further direct the apparatus to:

responsive to a determination the selected resolution associated with the token returned requires action on the client, send the response representative of a set of actions for executing the selected resolution to the client, whereby data on the client is one of synchronized with corresponding data on the server and updated independent of corresponding data on the server.

19. The apparatus of claim 15 wherein the processor unit executes the computer executable program code to further direct the apparatus to:
- determine whether the selected resolution associated with the token returned requires action on the client; and
- responsive to a determination the selected resolution associated with the token returned does not require action on the client, send a response representative of a result of executing the selected resolution to the client.

20. The apparatus of claim 19 wherein the processor unit executes the computer executable program code to send a response representative of a result of executing the selected resolution to the client further direct the apparatus to:
- include information indicative of success or failure of the selected resolution in terms of correcting the identified error and a set of actions for the client to perform on the client, wherein the set of actions comprises zero or more actions.

* * * * *